June 9, 1964 A. E. BREWSTER 3,136,981

MAGNETIC INFORMATION STORAGE ARRANGEMENTS

Filed June 9, 1959 4 Sheets-Sheet 1

Inventor
A.E.BREWSTER
By C.H. Suydam
AGENT

June 9, 1964 A. E. BREWSTER 3,136,981

MAGNETIC INFORMATION STORAGE ARRANGEMENTS

Filed June 9, 1959 4 Sheets-Sheet 2

Inventor
A.E.BREWSTER
By C.H. Suydam
AGENT

Inventor
A.E. BREWSTER
By C. H. Suydam
AGENT

MAGNETIC INFORMATION STORAGE ARRANGEMENTS

Filed June 9, 1959 4 Sheets-Sheet 4

Inventor

A.E.BREWSTER

By C. H. Suydam

AGENT

United States Patent Office 3,136,981

Patented June 9, 1964

3,136,981

MAGNETIC INFORMATION STORAGE ARRANGEMENTS

Arthur Edward Brewster, London, England, assignor to International Standard Electric Corporation, New York, N.Y., a corporation of Delaware Filed June 9, 1959, Ser. No. 819,089
Claims priority, application Great Britain July 3, 1958
9 Claims. (Cl. 340—174)

The present invention relates to information storage arrangements employing magnetic cores and is concerned with means for extracting the stored information.

The invention is particularly, though not exclusively, useful in magnetic binary coders used for electric pulse code modulation systems of communication. Coders of this type usually produce the respective digit pulses of the code simultaneously on separate conductors, and it is often necessary to provide means for obtaining them serially on a single conductor so that they can be transmitted over a single channel on a time-division basis.

The digit pulses may be stored in corresponding magnetic storage devices and, in order to produce them serially, the storage devices have to be scanned in some way in order to read out the digits which they contain. This is, of course, a very usual type of problem in information storage systems, but it is found that the usual simple methods of reading out present difficulties with magnetic storage due to the loading of the read-out device by the storage device.

The object of the present invention is to provide a reading-out arrangement which overcomes this difficulty, and which, though of more general application, is suitable for use in magnetic coders.

The invention will be described with reference to the accompanying drawings, in which.

Figure 5:
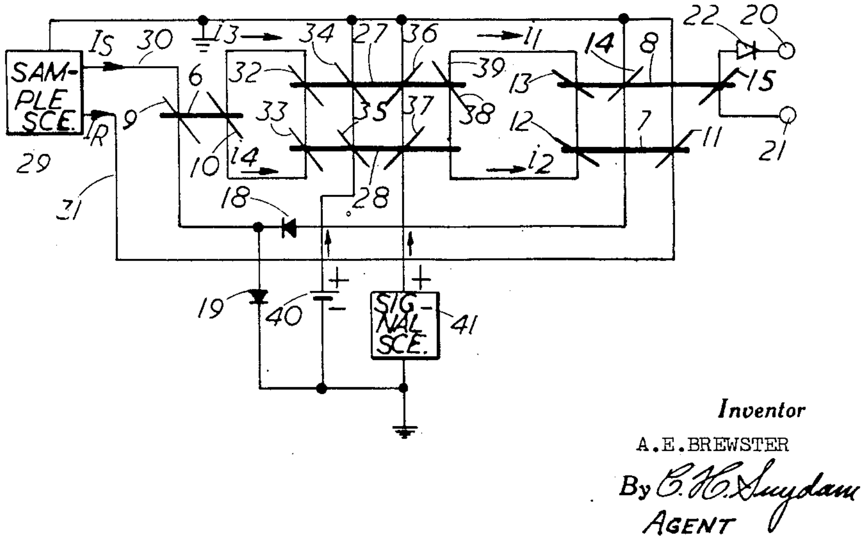
FIG. 5 shows a schematic circuit diagram illustrating how the circuit of FIG. 2 may be applied to a magnetic coder.
Figure 9:
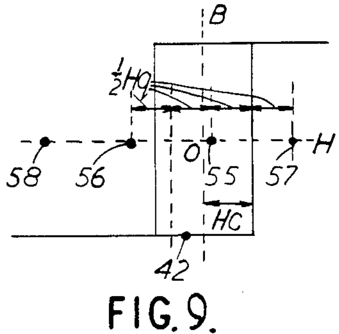
Figure 10:
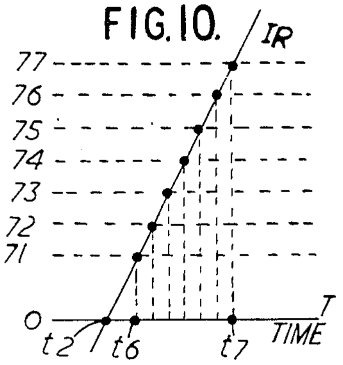
Figure 7:
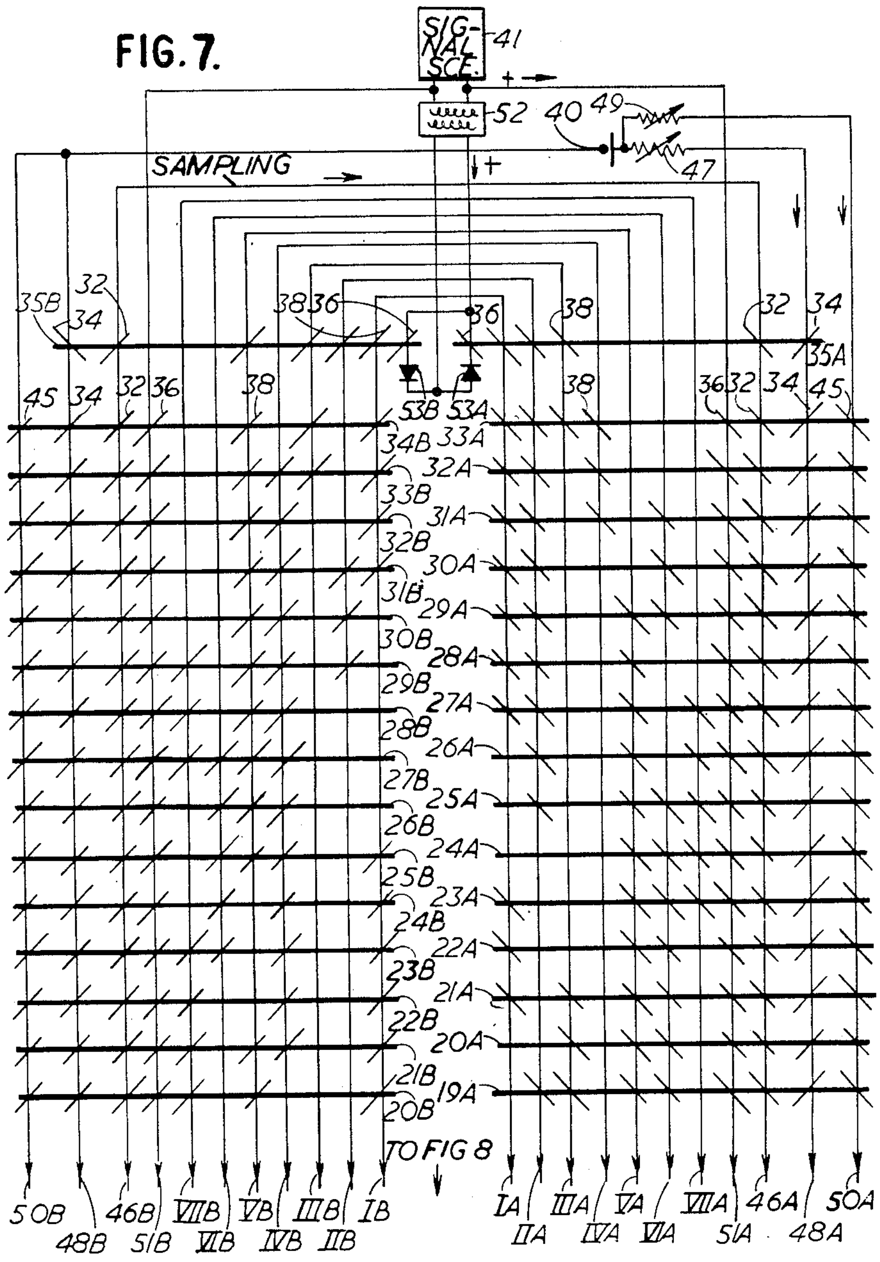
Figure 8:
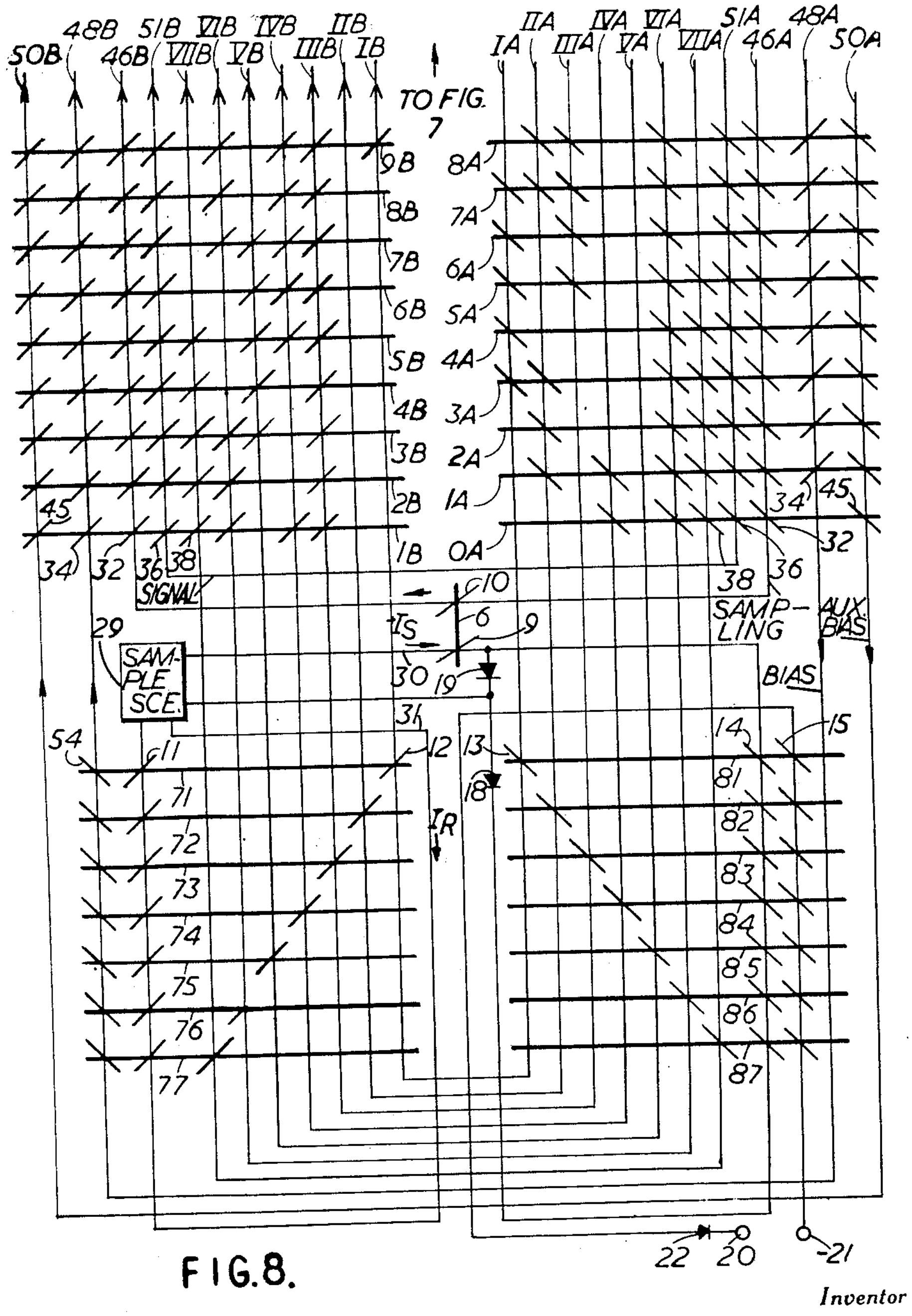

FIGS. 7 and 8 together show a schematic circuit diagram of a complete magnetic coder embodying the arrangement of FIG. 5; and FIGS. 9 and 10 show graphical diagrams used to explain the operation of FIGS. 7 and 8.

Figure 1:
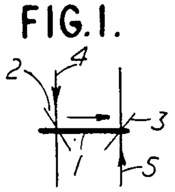
FIG. 1 shows a diagram used to explain a convention adopted in this specification.

The invention employs as storage devices cores of ferrite or other ferromagnetic material having a hysteresis curve with sharp discontinuities, which cores can exist in two conditions with the flux substantially saturated in opposite directions and can be triggered from one condition to the other by means of suitable currents or pulses supplied to windings thereon. In order to simplify the circuits, a magnetic core is diagrammatically shown as a thick, generally horizontal, straight line, and a winding on the core is represented as a short inclined line, and the direction of slope of the short line indicates the direction of winding. Thus in FIG. 1, the magnetic core 1 has a winding 2 represented by a short line inclined upwards to the left and another winding 3 represented by a short line inclined upwards to the right. Vertical conductors 4 and 5 drawn through the intersections of windings 2 and 3 with the core 1 indicate conductors with which the windings 2 and 3 are connected respectively in series. It will be assumed that the winding 2, which slopes upwards to the left, is wound "straight" so that winding 3 is wound "reverse"; also that a current flowing downwards in conductor 4, or upwards in conductor 5, produces a flux from left to right in the core 1, as indicated by the arrow. Then a current flowing upwards in conductor 4 or downwards in conductor 5 will produce a flux in the opposite direction. It will be understood, of course, that the core will preferably be toroidal in form and not a straight rod as indicated in FIG. 1; and any core may have any number of separate windings, some of which may be wound "straight" and others "reverse," and such windings may have any number of turns.

Figure 2:
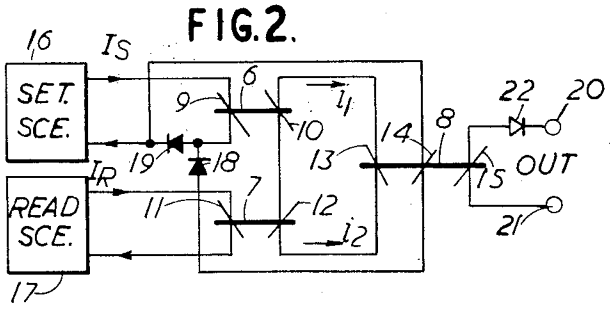
FIG. 2 shows a schematic circuit diagram of an arrangement for reading out information from an information store, according to the invention.

An embodiment of the invention is shown in FIG. 2. It comprises three magnetic cores 6, 7 and 8 called respectively the setting core, the reading core and the output core. Core 6 has an input winding 9 and an output winding 10 both wound straight. Core 7 has an input winding 11 wound straight and an output winding 12 wound reverse. Core 8 has an input winding 13 wound straight and a bias winding 14 and an output winding 15 wound reverse. A setting current source 16 is connected to winding 9 and a reading current source 17 is connected to winding 11. These sources should preferably be high impedance sources and supply currents $I_S$ and $I_R$ which when positive flow downwards through windings 9 and 11 respectively. As will be explained later, $I_S$ and $I_R$ are initially negative so that both the cores 6 and 7 are biased with a flux from right to left.

The windings 10, 12 and 13 are connected in a series loop circuit so that a clockwise current in the loop flows upwards through windings 12 and 10 and downwards through winding 13. The bias winding 14 is connected in series with the winding 9 of the setting core 6 through a rectifier 18 directed so that it allows a current to pass downwards through the winding 14 only when $I_S$ is negative. A second rectifier 19 completes the connection between the source 16 and the winding 9 when $I_S$ is positive, and is so directed that it is blocked when $I_S$ is negative. Thus when $I_S$ is positive it flows from the source 16 through winding 9 and rectifier 19, but when $I_S$ is negative it flows from the source 16 through winding 9, rectifier 18 and winding 14. The output winding 15 is connected to a pair of output terminals 20, 21 through a rectifier 22.

Figure 3:
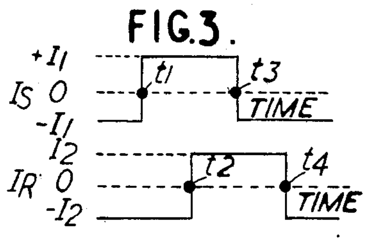
FIGS. 3 and 4 show graphical diagrams used to explain the operation of FIG. 2.
Figure 4:
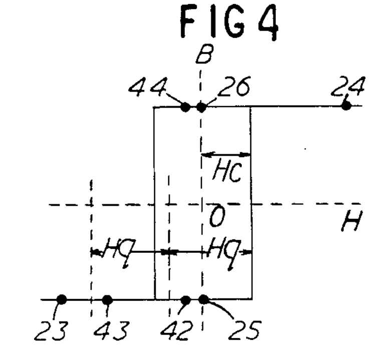

Referring to FIG. 3, the setting current $I_S$ initially has a value $-I_1$, and the reading current $I_R$ initially has a value $-I_2$. Thus, as already stated, cores 6 and 7 are both biased negatively to a point such as 23 on the lower branch of the hysteresis curve shown idealised in FIG. 4. Also, since the rectifier 18 is conductive and rectifier 19 is blocked in this condition the core 8 will also be biased to a similar point. At time $t_1$ (FIG. 3) a bit of information is indicated by the change of the setting current $I_S$ from $-I_1$ to $+I_1$. This switches the condition of the core 6 to a point such as 24 on the upper branch of the hysteresis curve (FIG. 4), and the sudden change in flux generates an E.M.F. in the winding 10 which produces a current pulse $i_1$ which flows downwards in the winding 3. However, at the time $t_1$ the reversal of the current $I_S$ unblocks the rectifier 19 and blocks the rectifier 18, which effectively removes the bias from the core 8 so that it assumes the condition represented approximately by the point 25 of FIG. 4, and can therefore be triggered by the current pulse $i_1$ to the condition represented by the point 26. The change in flux so produced induces an E.M.F. in the ouptut winding 15, but the rectifier 22 is directed so that it will be blocked thereby so that no output current pulse is produced. The bit of information is now stored on the output core 8. In order to read out the bit of information, at some time $t_2$ later than $t_1$, the current $I_R$ from the source 17 is reversed from $-I_2$ to $+I_2$. Since the winding 12 is wound reverse, a current pulse $i_2$ will thereby be generated upwards through the winding 13 which triggers the condition of the output core 8 back from the point 26 to the point 25 (FIG. 4). This time the E.M.F. in the winding 15 is in the opposite direction, so that the rectifier 22 is unblocked and allows a pulse to reach the output terminals 20 and 21.

At some time $t_3$ after $t_2$ (FIG. 3), the setting current $I_S$ changes back again to $-I_1$. This produces a current pulse $i_1$ in the loop circuit, in the opposite direction to that shown, and also biases the output core 8 negatively from the point 25 to the point 23 (FIG. 4). The current pulse $-i_1$ thus has no effect on the output core 8. It also has no effect on the reading core 7 because this core is biased to the point 24 (FIG. 4). Lastly, at some time $t_4$ after $t_3$ (FIG. 3), the current $I_R$ from the reading source 17 changes back from $+I_2$ to $-I_2$. This produces a current pulse $-i_2$ in the loop circuit, in the opposite direction to that shown, which has no effect on the setting core 6 because this core is biased to the point 23 (FIG. 4). This current pulse would however trigger the output core 8 again, were it not for the bias current derived from the setting current $I_S$ flowing through the bias winding 14. This bias current is provided according to the invention to prevent the unwanted triggering of the output core 8 when the reading core 7 is reset to its original condition at time $t_4$.

It will be understood that there is in general no requirement governing the spacing of the times $t_1$ to $t_4$, but it may in some cases be convenient that they be equally spaced. Although the setting and reading currents $I_S$ and $I_R$ have been assumed to be in the form of rectangular pulses, this is not essential; they could, for example, be portions of sinewaves arranged so that the times $t_1$ to $t_4$ are the times at which the sinewaves cross the zero axis. In such a case the sinewaves should be of sufficient amplitude to ensure that sufficiently rapid reversal of current occurs at these times.

When sinewaves are used, it may be convenient for the setting and reading waves $I_S$ and $I_R$ to be in quadrature, in which case the times $t_1$ to $t_4$ will be equally spaced.

In the case described above with reference to FIG. 3, the bit of information is recorded at time $t_1$ when the setting current changes from $-_1$ to $+I_1$ and is read out at time $t_2$ when the reading current changes from $-I_2$ to $+I_2$. The operations at times $t_3$ and $t_4$ are concerned with restoring the circuit to normal so that it is ready to receive another bit of information. In practice the bit of information may not necessarily occur in the precise form of a current reversal. It is likely to be in the form of a short unidirectional pulse. However, it will be obvious to those skilled in the art that rectangular pulses such as those shown in FIG. 3 can be produced by variout conventional means in response to a short pulse corresponding to a bit of information.

It may be mentioned that the current pulse $i_1$ can also be considered as representing the bit of information.

It will be noted that in the arrangement of FIG. 2, the reading core 7 is biased to a point such as 23 (FIG. 4) when the output core 8 is triggered by the setting core 6. The core 7 is thus in such a condition that it does not present any appreciable impedance to the setting current pulse $i_1$. Likewise the setting core 6 is in a condition such that it does not present any appreciable impedance to the reading current pulse $i_2$. Thus it will be seen that the core which is for the time being inactive does not load the output winding of the core which triggers the output core.

Another desirable feature of FIG. 2 is a particular choice of the number of turns of the winding 13. The electromotive force generated in the winding 10 when the core 6 is triggered is $e_1=n_1.d\phi_1/dt$, where $n_1$ is the number of turns of the winding 10 and $d\phi_1/dt$ is the rate of change of the flux, which depends on the rate of switching. Since the total flux change is limited to some value $\phi a$ this value of $e_1$ can persist only for a certain time $T_1$ and then falls rapidly to zero. The current $i_1$ will however tend to increase until the core 8 begins to be triggered and then a back electromotive force $e_2$ is generated which opposes $e_1$ and limits $i_1$. Then $e_2=n_2.d\phi_2/dt$ where $n_2$ is the number of turns of the winding 13 and $d\phi_2/dt$ is the rate of change of the flux. Again, the total flux change is limited to some value $\phi_b$, and $e_2$ can persist for a time $T_2$. If $T_2$ is less than $T_1$, $i_1$ can increase above the value necessary to trigger the core 8 and this may be objectionable and inefficient. Similarly if $T_2$ is greater than $T_1$, the core 8 may not be completely triggered. The best and most efficient arrangement is to ensure that $T_1=T_2$ which is obtained by making $$n_1/\phi_a=n_2\phi_b$$

If the cores 6 and 8 are composed of the same magnetic material then $\phi_a=\phi_b$ and the above condition reduces to $n_1=n_2$. This condition results in all the energy generated by the triggering of the core 6 being used up in triggering the core 8. It follows that the winding 12 on the reading core 7 should preferably have the same number of turns as windings 10 and 13, assuming that all the cores are made of the same magnetic material. The importance of this choice will be seen in the application of the FIG. 2 arrangement to a magnetic coder, an example of which is shown in FIG. 5 for reading out the digit pulses serially.

The type of coder concerned is similar to that disclosed in the specification of co-pending application Serial No. 708,186, filed January 10, 1958, now Patent No. 2,954,550. This type of coder has a coding element comprising a magnetic core for each amplitude level represented by the code, and delivers the digit pulses of each code combination to separate conductors substantially at the same time. In FIG. 5 the circuit is simplified in order that the operation may be easily understood. It comprises a setting or sampling core 6, a reading core 7 and an output core 8 as in FIG. 2, but the loop circuit comprising the windings 10, 12 and 13 is effectively divided into two loops coupled by the coding cores of the coder. Only two of these cores are shown, and are designated 27 and 28.

The coder is controlled by a preferably high impedance sampling source 29 which corresponds to the two sources 16 and 17 of FIG. 2. This source supplies a first sinewave current $I_S$ to a conductor 30, and a second sinewave current $I_R$ to a conductor 31. The two sinewave currents $I_S$ and $I_R$ are in quadrature, and have a frequency equal to the frequency at which it is desired to sample the signal wave. The negative loops of the sinewave, $I_S$ pass through winding 9; rectifier 18 and winding 14, as in FIG. 2, but the positive loops pass through the winding 9 and rectifier 19, and not through the winding 14. The sinewave $I_R$ passes through the winding 11 of the reading core 7, as in FIG. 2.

The coding cores 27 and 28 are provided with respective sampling windings 32, 33 and bias windings 34, 35 wound straight, and with signal windings 36, 37 wound reverse. Each core also has one or more digit windings connected respectively in series with $n$ digit conductors, for a code of $n$ digits. The distribution of the digit windings on the cores is determined by the form of the binary code adopted. One of these digit windings is shown at 38 (wound straight) on core 27 and is connected in series with one of the digit conductors 39. The core 28 is assumed not to have a digit winding in series with the digit conductor 39. Both cores may have other digit windings (not shown) in series with other digit conductors (also not shown). The digit conductor 39 will also have in series with it some other digit windings (not shown) on some of the other coding cores (not shown).

The sampling windings 32, 33 are connected in series with the output winding 10 of the setting core 6. The digit conductor 39 is connected in series with the windings 12 and 13 of the reading and output cores 7 and 8. The bias windings 34 and 35 of the cores 27 and 28 are connected in series to a bias source 40 which will be assumed to supply a constant positive bias current upwards through these windings. The signal windings 36 and 37 are connected in series to a source 41 of a signal wave to be coded, and it will be assumed that the source 41 supplies a varying positive signal current upwards through these windings. The windings 32 and 36 have the same number of turns as the windings 33 and 37 respectively, but the bias windings 34 and 35 have different numbers of turns. It will be clear that the signal current and the bias current produce opposing fluxes in the coding cores.

It is preferable, though not essential, that the total resistance of the loop circuit containing the windings 10, 32 and 33 should be reduced to the smallest practicable value, and that the total resistance of the loop circuit containing the windings 38, 12 and 13 should be appreciable, though not large. This result can be obtained by using the largest suitable gauge of copper wire of the windings 10, 32 and 33, and a rather smaller gauge of wire for the windings 38, 12 and 13.

It is also preferable, though not essential, that the coding cores 27, 28, and the others (not shown), should comprise relatively large toroids (about ¼ inch diameter, for example) and that the cores 6, 7 and 8 should comprise relatively small toroids (about 0.08 inch diameter, for example).

In the circuit of FIG. 5 it is necessary to arrange so that the quantum difference between two adjacent signal amplitude levels corresponds to a magnetic field $H_q$ which is less than $2H_c$, where $H_c$ is the coercivity of the magnetic material (FIG. 4). Let it now be assumed that the core 27 corresponds to the signal amplitude level $m$, and that core 28 corresponds to level $m-1$. Then winding 34 will have $m$ turns (or a multiple thereof) and winding 35 will have $m-1$ turns (or the same multiple thereof). Let it be further assumed that the signal amplitude at the moment of sampling is such that core 27 is biased by the combined signal and bias currents to a point 42 on the lower branch of the hysteresis curve (FIG. 4) having an abscissa lying between $Hc$ and $Hc-Hq$. Then the core 28 will be biased to a point 43 on the lower branch having an abscissa lying between $Hc-Hq$ and $Hc-2Hq$.

Figure 6:
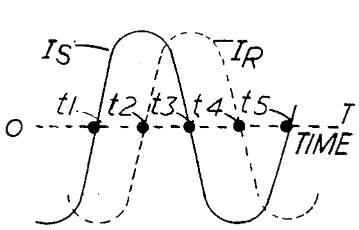
FIG. 6 shows a graphical diagram used to explain the operation of FIG. 5.

FIG. 6 shows the sampling current waves $I_S$ supplied by the source 29 (FIG. 5) to conductor 30 and the reading current wave $I_R$ supplied to conductor 31. The two waves are in quadrature, as already mentioned. Sampling is initiated substantially at time $t_1$ when the $I_S$ wave amplitude changes from negative to positive. At this time the setting core 6 (FIG. 5) is triggered, and a current pulse $i_3$ is supplied from the winding 10 to the two windings 32 and 33 in series. This current pulse will effectively move the points 42 and 43 (FIG. 4) to the right and, as already explained, the current $i_3$ increases until the core 27 is triggered when the points 42 reaches the lower right hand corner of the hysteresis curve. If the windings 10 and 32 have the same number of turns, then substantially the whole of the energy of the pulse will be consumed in triggering the core 27, as already explained, and the core 28 will accordingly fail to be triggered because there is no energy available to shift the point 43 beyond the point it has reached when the triggering of core 27 occurs. On the disappearance of the current pulse $i_3$ the core 27 will be left in the condition corresponding to the point 44 on the upper branch of the curve (FIG. 4).

It should be pointed out that all the other coding cores (not shown) of the coder have their sampling windings in series with the windings 32 and 33, but none of these cores can be triggered by the current pulse $i_3$ because those corresponding to levels less than $m-1$ are biased to a condition corresponding to a point on the upper branch of the curve (FIG. 4), and those corresponding to levels greater than $m$ will be biased to a condition corresponding to a point on the lower branch to the left of the point 43.

The triggering of the core 27 causes the digit winding 38 to supply a current pulse $i_1$ to the conductor 39 which triggers and sets the output core 8 in the manner explained with reference to FIG. 2. As can be seen from FIG. 6, at the $t_1$ the reading core 7 is biased by a negative portion of the wave $I_R$ so that it cannot be triggered, and presents substantially no impedance to the pulse $i_1$.

At time $t_2$, the amplitude of the wave $I_R$ passes through zero and generates the reading pulse $i_2$ which reverses the condition of the output core 8, and this supplies an output digit pulse to terminals 20 and 21, as described with reference to FIG. 2. The pulse $i_2$, however, passes through the digit winding 38 of the coding core 27 which generates a current pulse $i_4$ in the loop comprising the windings 10, 32 and 33 by transformer action between the windings 38 and 32 of the core 27. However at time $t_2$ the core 6 is biassed by the positive portion of the $I_S$ wave (FIG. 6) and so the winding 10 presents a substantially no impedance to the loop. The loop being also of negligible resistance, the impedance presented by the winding 38 to the current pulse $i_2$ is also negligible, so does not hinder the triggering of the output core 8 thereby.

It is also to be noted that since the winding 32 is practically short circuited by the loop, the flux in the core 27 is unable to change appreciably during the period of the current pulse $i_2$, nor can the current $i_4$ increase to any appreciable value in this period. It follows that there can be no tendency for the conditions of any of the coding cores to be changed by the operation of the core 7 at time $t_2$. The action of the loop containing the windings 10, 32 and 33 at this time will be seen to be analogous to the "slugging" of a relay for preventing a quick change in the flux of the relay core.

At time $t_3$ (FIG. 6) the amplitude of the wave $I_S$ changes sign, and a current pulse $-i_3$ is supplied through the winding 32 of the core 27 which restores the condition of this core from the point 44 to the point 42 (FIG. 4). The loop circuit comprising the windings 38, 12 and 13 will evidently have a slugging effect, since both the windings 12 and 13 present negligible impedance at this time. However, as stated above, it is preferable that this loop circuit should not have a negligible resistance, so that the slugging effect is in fact much smaller than in the case of the other loop circuit. The effect will be to delay the restoration of the core 27 (or in other words to increase the duration of the current pulse $-i_3$) but the current $-i_3$ will always increase sufficiently to trigger the core 27.

It should, however, be pointed out that when the core 27 is initially trigged at time $t_1$ by the current pulse $i_3$, triggering is rapid because at that time the output core 8 is also due to be triggered and the impedance presented to the winding 38 is then relatively high, so the slugging effect is negligible. The sampling current pulse $i_3$ is thus much shorter than the restoring current pulse $-i_3$.

At time $t_4$ the amplitude of the wave $I_R$ passes through zero again and resets the reading core 7 without triggering the output core 8, as explained with reference to FIG. 2, because of the bias supplied to the winding 14 by the negative position of the $I_S$ wave at time $t_4$.

At time $t_5$ the amplitude of the $I_S$ wave passes through zero again and initiates the next sampling operation, which proceeds as already explained, except that if the signal amplitude has changed, some coding core other than 27 may be triggered.

It will be understood that in the complete coder, there will be one setting or sampling core 6 with its winding 10 connected in series with the sampling windings such as 32 of all the coding cores. There will however be $n$ separate digit conductors such as 39, and each of these will be provided with a reading core 7 and an output core 8. The output windings 15 of the $n$ output cores 8 will be connected in series. It is also necessary to arrange for the $n$ reading cores such as 7 to be triggered in sequence by the wave $I_R$, and this may be done by providing means (not shown in FIG. 5) for biasing each core differently. These details will be shown in the example of a complete coder illustrated in FIGS. 7 and 8.

It should be noted that in the coder described in the specification referred to above, the sampling is determined by a current pulse of specified amplitude. This leads to difficulties in defining the sampling current, and in ensuring that only one coding core is triggered at each sampling. It has also been found that with this arrangement the quantum intervals between adjacent levels tend to be displaced by amounts depending on the number of digit pulses present in the code combinations corresponding to these levels.

In the arrangement of FIG. 5, sampling is effectively determined by a pulse of given energy, and is self adjusting in the sense that the triggering of a coding core prevents the possibility of any other core being also triggered. It does not suffer from the objections mentioned above.

An example of a magnetic coder employing the features of FIG. 5 is shown in FIGS. 7 and 8. FIG. 8 should be arranged below FIG. 7, with the correspondingly numbered conductors of the two figures connected together. The coder is arranged to produce one form of a 7-digit unit disparity cyclic permutation code. The coder could however be arranged to produce any type of binary code without any material alteration. The above-mentioned code can provide 70 different code combinations, and there are accordingly 70 coding cores, each of which corresponds to a different signal amplitude level. In order to save space, some of the said 70 coding cores have been omitted, and it will be understood that the omitted cores will be arranged between the two groups shown respectively in FIGS. 7 and 8 and will be connected similarly to those shown.

The coder is arranged to provide for both positive and negative signal amplitudes. Thus the cores on the right-hand side of FIGS. 7 and 8 provide for zero and 33 positive levels, and the others for 34 negative levels. There are also two extra cores known as "peak limit" cores which provide two respective code combinations if the signal amplitude reaches or exceeds the maximum positive or negative level for which the coder is designed. Thus when these two limit combinations are decoded at the receiver, the corresponding recovered signal amplitude will be equal to the maximum whatever the amount of excess at the transmitter.

The coding cores shown in FIGS. 7 and 8 are designated by the level numbers to which they correspond, with the letter A for positive levels and B for negative levels. The two limit cores are designated 35A and 35B.

Each coding core has a sampling winding 32 and a signal winding 36, and also a main bias winding 34, except core No. 0A, which corresponds to zero level. These windings are designated on cores 33A and 34B and correspond to the windings with the same designations in FIG. 5. Each coding core, including core 0A, also has an auxiliary bias winding 45 for a reason which will be explained later. Each coding core has further three or four digit windings 38, of which one is designated on each of the cores 33A and 34B. The digit windings of the coding cores are arranged in series with seven digit loop circuits, the vertical conductors of which are designated in roman figures IA to VIIA on the right and IB to VIIB on the left. A core will have a digit winding in series with the corresponding loop if the code combination for the level represented by that core has a digit pulse in the corresponding position. Thus, for example, the code combination for the positive level 30 is 1100010 (where "1" indicates a digit pulse and "0" no digit pulse), so core 30A (FIG. 7) has three digit windings in series respectively with conductors IA, IIA and VIA.

The sampling windings 32 of the cores are connected in series with a sampling loop including the output winding 10 of the setting core 6 (FIG. 8). The vertical conductors of this loop are designated 46A on the right and 46B on the left. The main bias windings 34 are connected in series with a main bias loop including the bias source 40 connected in series with a variable resistor 47 (FIG. 7) by means of which the bias current may be adjusted. The vertical conductors of the bias loop are designated 48A on the right and 48B on the left. The auxiliary bias windings 45 are connected in series with an auxiliary bias loop including the bias source 40 and a second variable resistor 49 by means of which the auxiliary bias current may be adjusted. The vertical conductors of the auxiliary bias loop are designated 50A on the right and 50B on the left. The signal windings 36 are connected in series with a signal loop supplied from the signal source 41 (FIG. 7). The vertical conductors of this loop are designated 51A on the right and 51B on the left.

The peak limit cores 35A and 35B have sampling windings 32 and bias windings 34 in series with the sampling and bias loops, respectively, but no auxiliary bias windings. These cores also have signal windings 36, but these are not connected in series with the signal loop, but are supplied separately from the source 41 through a transformer device 52. The signal wave is supplied to the signal windings 36 on the two peak limit cores 35A and 35B through respective oppositely directed rectifiers 53A and 53B, the purpose of which will be explained later. The signal source 41 should preferably present a low impedance to the signal loop, but the impedance should be stepped up to a relatively high value by the transformer 52 for connection to the circuit of the rectifiers 53A and 53B. The peak limit cores have digit windings 38 in series with the digit loops providing the code combination 1110000 for the positive limit and 1110100 for the negative limit.

While only one setting or sampling core 6 (FIG. 8) is necessary for the coder, there must be seven reading cores designated 71 to 77 and seven output cores designated 81 to 87, one corresponding to each digit in each case. The input windings 11 of the reading cores 71 to 77 are connected in series with the output conductor 31 from the sampling source 29 to which the reading current $I_R$ is supplied, as in FIG. 5. The output windings 12 of these cores are connected in series respectively with the digit loop conductors IB to VIIB. The reading cores, however, differ from the reading core 7 of FIG. 5 in having respective bias windings 54 connected in series with the bias conductor 48B. Each of these bias windings, however, has a different number of turns chosen to ensure that the reading cores 71 to 77 are triggered in succession, as will be explained more fully later.

The output cores 81 and 87 have output windings 15 all connected in series to the output terminals 20, 21. Only a single rectifier 22 is necessary to block the unwanted output pulses produced by the setting of the output cores. These cores have their input windings 13 connected respectively in series with the digit conductors IA to VIIA, and the bias windings 14 are connected to the output conductor 30 of the sampling source 29 through the input winding 9 of the setting or sampling core 6. The rectifier 18 is connected in series with the return conductor from the windings 14 to the source 29. Thus each of the output cores 81 to 87 is arranged in the same way as the output core 8 of FIG. 5.

All the sampling windings 32 of the coding cores 0A to 33A and 1B to 34B have the same number of turns; likewise all the signal windings 36 and all the digit windings 38 have the same number of turns in each case, but the sampling, signal and digit windings need not respectively have the same number of turns. The main bias winding 34, however, of the coding core $m$A or $m$B has $m$ turns (or an integral multiple of $m$ turns). The bias current from the source 40 (FIG. 7) is so adjusted that the bias magnetic field produced in $m.Hq$ in core $m$A or $m$B.

The auxiliary bias windings 45 have the same number of turns on all the coding cores, and the resistor 49 (FIG. 7) is adjusted to produce a bias current which biases all the cores by the same amount and in the same direction, as will be explained later.

In FIGS. 7 and 8, the convention explained with reference to FIG. 1 will be adopted for all the cores except No. 6, namely that a current flowing downwards through a straight winding produces a flux through the core from left to right as the core is shown in the drawing. For core No. 6, however, which is drawn vertically for convenience, it will be assumed that windings 9 and 10 are wound straight, and that a current flowing from left to right in conductor 30 produces a flux in the upward direction in the core.

In the case of the cores on the right-hand side of FIGS. 7 and 8, all the windings are wound straight, except the main bias windings 34, which are wound reverse. In the case of the cores on the left-hand side all the windings are wound reverse except (*a*) The bias winding 34 on the peak limit core 35B, (*b*) The bias windings 54 of the reading cores 71 to 77.

All those last mentioned windings are wound straight.

FIG. 9 shows a hysteresis curve similar to FIG. 4 modified to indicate the effect of the auxiliary bias windings 45. In order that the coding cores, shown in FIGS. 7 and 8, shall properly correspond with the respective quantized levels, it is necessary to remove the effect of the coercivity H$c$. It is also preferable that the boundaries of level $m$, for example, should correspond to $(m\pm\frac{1}{2})$H$q$. Since the main bias windings 34, acting alone, bias the cores with respect to zero magnetic field, while triggering occurs at a field +H$c$, it is necessary to subtract H$c$ from the bias of each core. If also the boundaries are to be defined as above, then it is necessary further to add ½H$q$ to the bias of each core. Thus each bias winding should provide an auxiliary bias field of $Hc-\frac{1}{2}Hq$ in opposition to the main bias field. The auxiliary bias windings 45 thus have the same number of turns on each coding core (for example, 1 turn) and the auxiliary bias current is adjusted so that the bias field produced is $Hc-\frac{1}{2}Hq$ in each core. Thus the total bias for core No. $m$A is $Hc-(m+\frac{1}{2})Hq$ and the total bias for core No. $m$B is $Hc+(m-\frac{1}{2})Hq$. The total bias fields for cores 0A, 1A and 1B are shown in FIG. 9 by the points 55, 56 and 57 respectively, on the H-axis, the total bias of the other A-cores being represented by respective points (not shown) spaced apart by H$q$ to the left of the point 56, and the total bias of the other B-cores being represented by respective points (not shown) spaced apart by H$q$ to the right of the point 57.

From what has already been explained above, it will be clear that if the signal level corresponds to a magnetic field between +½H$q$ and −½H$q$, the condition of core 0A will be represented by a point 42 lying between H$c$ and $Hc-Hq$, and core 0A will be the one to be triggered at the time $t_1$ (FIG. 6) by the sampling wave $I_S$. It will be easily seen from FIG. 9, that if the signal level corresponds to a magnetic field within the limits $(m\pm\frac{1}{2})Hq$ then core $m$A or $m$B, according as $m$ is positive or negative, will be trigged at time $t_1$.

The triggering of a core $m$A or $m$B results in digit pulses being supplied to those digit conductors corresponding to the relevant code combination. The digit pulses then set the corresponding ones of the output core 81 to 87 (FIG. 8) which are then scanned in sequence by the reading cores 71 to 77 and supply the digit pulses in sequence to terminals 20 and 21.

Thus, for example, for a positive signal level 8, the core 8A (FIG. 8) supplies digit pulses to conductors IIA, IIIA and VIA, so that the output cores 82, 83 and 86 are set, and the digit combination 0110010 is supplied in sequence to the output terminals 20, 21.

As explained with reference to FIG. 5, the output cores 81 to 87 are all biased at the time $t_4$ (FIG. 6) by the current supplied to the bias windings 14 through the rectifier 18 when $I_S$ is negative, so that these cores are not affected by the restoration of the reading cores 71 to 77.

The operation of the peak limit cores 35A and 35B (FIG. 7) will now be explained. Assuming that the bias winding 34 of the coding core $m$A or $m$B has $m$ turns, then the bias winding 34 of the core 35A is given, for example, two turns, and the bias current will then produce a total bias flux of 2H$q$, corresponding to point 58, FIG. 9. Disregarding the current through the signal winding 36 of the core 35A, it will be seen that if the signal amplitude is positive and is greater than the amplitude corresponding to level 33, none of the coding cores 0A to 33A or 1B to 34B can be triggered by the sampling pulse generated by the winding 10 of the sampling core 6. The energy of this pulse is thus not expended, and the current in the sampling loop will therefore rise until the core 35A is triggered. The core 35B is also provided with a bias winding 34 of two turns, but it is wound reverse, while that of core 35A is wound straight. Since the bias current flows in opposite directions through those two windings, both cores are biased to the left and will behave identically. Thus if the signal amplitude exceeds the maximum positive limit, both the peak limit cores would tend to be triggered. It will be evident also that if the signal amplitude is negative and exceeds the maximum negative limit, again none of the coding cores can be triggered, and so both the peak limit cores 35A and 35B would tend to be triggered. Therefore the signal wave is supplied to the signal windings 36 of the peak limit cores from the transformer 52 through the rectifiers 53A and 53B, which are so directed that when the signal amplitude is positive, the signal current flows through the rectifier 53B and biases the negative peak limit core 35B so that it cannot be triggered; and when the signal amplitude is negative, the signal current flows through the rectifier 53A so that the peak limit core 35A cannot be triggered.

The two peak limit cores correspond to two additional levels +34 and −35 and are respectively triggered when the signal amplitude lies outside the limits defined by the levels +33 and −34. The peak limit cores 35A and 35B are provided with digit windings arranged to produce the code combinations 1110000 and 1110100 respectively, and the corresponding one of these combinations will be continuously produced so long as the signal amplitude remains outside the said limits.

It should be mentioned that it is necessary that the value of $H_c$ for the peak limit cores 35A and 35B should exceed $2H_q$ in order that the core should not be restored immediately after triggering. Thus it may be preferable to use a different magnetic material for the cores 35A and 35B, with a coercivity of, say 3 or 4 oersteds, assuming that the coercivity of the other cores is about 1 oersted.

The manner in which the reading cores 71 to 77 (FIG. 8) are caused to be triggered in succession in order to read out the digit pulses in sequence will be described with reference to FIG. 10. It will be assumed, for example, that the coder illustrated in FIGS. 7 and 8 corresponds to one of the channels of a 24 channel pulse code modulation system in which a separate coder is provided for each channel. Assuming that the sampling frequency is 10,000 cycles per second, this allows a channel period of about 4 microseconds during which the seven digit pulses of each channel must be transmitted. It is preferable to divide the 24 channels into six groups of four channels, and to arrange so that the source 29 (FIG. 8) provides six sampling waves $I_S$ and six corresponding read-out waves $I_R$ spaced apart in phase by 60° in each case. Then one pair of waves $I_S$ and $I_R$ is allotted to each group of four coders.

It will be assumed, therefore, that the coder illustrated in FIGS. 7 and 8 will be one of a group of four all of which are controlled by the waves $I_S$ and $I_R$ (FIG. 6) supplied from the sampling source 29.

FIG. 10 shows to a large scale the part of the reading out wave $I_R$ (FIG. 6) in the neighbourhood of the time $t_2$. This part of the wave is substantially straight. It will be assumed that the number of turns of the bias winding 54 on the cores 71 to 77 (FIG. 8) increases in steps of 1 turn from two turns on core 71 to 8 turns on core 77. The windings 54 are wound straight, and the bias current passes through them in the upward direction, so that the cores are biased with flux in the direction right to left. This has the effect of shifting the time axis upwards by increasing amounts for each code so that the time of triggering of the cores is made progressively later. In FIG. 10, OT is the original time axis which cuts the wave $I_R$ at time $t_2$, as in FIG. 6. The effective time axes for the cores 71 to 77 are similarly marked in FIG. 10, and it will be seen that core 71 will be triggered at time $t_6$ slightly after $t_2$, and core 77 at $t_7$ while the other cores will be triggered at intermediate instants equally spaced between $t_6$ and $t_7$. Thus it will be clear that the digit pulses will be delivered to terminals 20 and 21 in sequence at equal intervals between $t_6$ and $t_7$.

It will be necessary to arrange so that in a 24 channel system the period $t_6$ to $t_7$ does not exceed 4 microseconds. This can be ensured by suitable choice of the amplitude of the reading out wave $I_R$ and of the number of turns of the windings 11 on the cores 71 to 77, which will, of course be the same in each case.

In the case of the three other coders of the group, it is only necessary to provide the bias windings 54 with suitable direction and number of turns. Thus for the coder corresponding to the next later channel, the windings 54 could, for example, have 10 to 16 turns for cores 71 to 77 respectively. Then for the two coders corresponding to the two earlier channels of the four, the windings 54 would be reversed and would have 2 to 8 turns for one coder and 10 to 16 for the other. In this case, of course, the time axes on FIG. 10 would be effectively moved downwards, and the digit pulses would be supplied before the time $t_2$, instead of after, for these two coders.

With the values assumed above the four coders are operated over a phase range of the wave $I_R$ of about 30° on either side of the time axis OT, and over this range the lack of straightness of the sinewave results in errors not exceeding 5%.

It may be pointed out that the same waves $I_S$ and $I_R$ are used for all the four coders of the group, and that the rectifiers 18 and 19 do not need to be duplicated. This is because sampling takes place simultaneously in all the coders, but reading out the digit pulses takes place at different times as determined by the bias windings 54 on the reading out cores.

It will be understood that the sampling and reading out waves $I_S$ and $I_R$ could take other forms than sinewaves: for example they could be sawtooth waves.

The coder illustrated in FIGS. 7 and 8 can be modified without material alteration for any form of the binary code. Thus for a code of $n$ digits providing for N different signal levels, it is necessary to provide $N-2$ coding cores, 2 peak limit cores, n reading out cores, $n$ output cores and one sampling core. There will of course be $n$ digit loop circuits with the digit windings on the cores arranged in the digit loop circuits according to the pattern of the code adopted.

It may be mentioned also that the coder could also be modified to provide amplitude compression in the manner described in the specification of co-pending application, Serial No. 800,708, filed March 20, 1959.

The rectifier 22 in FIG. 8 indicates any convenient means for eliminating the unwanted pulses caused by the initial setting of the output cores 81 to 87. In practice the terminals 20 and 21 are usually connected to an amplifier (not shown) which may, for example, be a transistor amplifier. It is then simple to arrange so that the transistor in the first stage acts as a limiter instead of the rectifier 22, and suppresses the unwanted pulses.

While the principles of the invention have been described above in connection with specific embodiments, and particular modificaitons thereof, it is to be clearly understood that this description is made only by way of example and not as a limitation on the scope of the invention.

What we claim is:

1. An information storage arrangement comprising a first magnetic two-condition device, means operating in response to the receipt of time $t_1$ of a bit of information for reversing the condition of the said first magnetic two-condition device thereby storing the bit of information therein, a second magnetic two-condition device arranged to control the first device, means for reversing the condition of the second device at a time $t_2$ later than $t_1$, means responsive to such reversal to restore the first device to its original condition, means for deriving an output signal in response to the restoration of the first device, means for restoring the second device to its original condition at a time $t_4$ later than $t_2$, and means for biasing the first device at the time $t_4$ in such manner as to prevent the condition of the first device from being reversed in response to the restoration of the second device.

2. An information storage arrangement comprising a setting magnetic core, a reading magnetic core and an output magnetic core each having an input winding and an output winding, means for connecting the output windings of the setting and reading cores and the input winding of the output core in series, means for supplying a setting current and a reading current respectively to the input windings of the setting and reading cores in such manner as to bias each core into a first flux condition, means operating in response to a bit of information for reversing the direction of the setting current whereby the flux condition of the setting core is reversed and a current pulse is supplied from the output winding of the setting core which reverses the condition of the output core, and means for subsequently reversing the direction of the reading current whereby the flux condition of the reading core is reversed and a current pulse is supplied from the output winding of the reading core which restores the condition of the output core.

3. An electric pulse code modulator for producing a binary code of $n$ digits representing $m$ amplitude levels of a signal wave to be coded, comprising a setting core and $m$ coding cores each of which cores is composed of ferromagnetic material having a hysteresis curve with sharp discontinuities, and is capable of existing in two conditions with the magnetic flux substantially saturated in respectively opposite directions, the setting core having an input winding and an output winding and the coding cores each having a sampling winding and a signal winding, the output winding and all the sampling windings being connected in a series loop circuit, means for applying a different magnetic bias to each of the coding cores, means for supplying a signal wave to all the signal windings in series in such manner as to produce in each coding core a flux in opposition to the magnetic bias flux therein, a source of periodic sampling and reading waves in quadrature, means for applying the sampling wave to the input winding to trigger the setting core by reversing the condition of magnetic saturation thereof, whereby a setting pulse is supplied from the output winding for triggering a coding core in which the flux due to the signal wave substantially neutralises the magnetic bias flux therein, means controlled by the sampling wave for subsequently restoring the magnetic condition of the sampling core and of the last-mentioned coding core, and means controlled by the last-mentioned coding core and by the reading wave for producing a corresponding group of digit pulses representing the amplitude level of the signal wave at the time when the setting pulse appears.

4. A modulator according to claim 3, in which the range of amplitude levels to be represented by the code includes both positive and negative amplitude levels, comprising two additional peak limit cores of the same kind of ferromagnetic material as the first-mentioned cores, and corresponding respectively to the positive and negative limits of the said range, a sampling winding on each peak limit core connected in series with the said loop circuit, means for magnetically biasing each peak limit core in such manner that neither can be triggered by the setting pulse unless the signal wave amplitude lies outside the said range of amplitude levels so that no coding core is triggered by the setting pulse, means for applying he signal wave to bias magnetically one of the peak limit cores sufficiently to prevent it from being triggered, in such manner that the peak limit core which is triggered corresponds to the range limit of the same sign as the signal wave, and means controlled by the peak limit core which is triggered for producing a corresponding group of digit pulses.

5. A modulator according to claim 4, in which the means for producing a group of digit pulses from a core which has been triggered comprises one or more output digit windings not exceeding *n* in number on each of the cores other than the setting core, *n* digit loop circuits each of which is connected in series with an output digit winding on certain of the cores according to the plan of the code, *n* output cores each having an input winding connected in series with a corresponding one of the *n* digit loop circuits, the arrangement being such that the triggering of a coding or peak limti core causes those output cores to be triggered which are connected to digit windings on the coding or peak limit core, *n* reading cores each having an input winding, and also an output winding connected in series with a corresponding one of the *n* digit loop circuits, the output and reading cores being all composed of the same kind of ferromagnetic material as the previously mentioned cores, means for supplying the reading wave to all the input windings of the reading cores in series, means for applying respectively different magnetic bias fields to the *n* reading cores in such manner that the said reading cores are triggered at respectively different times by the reading wave, thereby restoring at different times those output cores which have been triggered, and means for delivering to an output circuit a digit pulse in response to the restoration of each output core.

6. A modulator according to claim 5, in which the last-mentioned means comprises an output winding on each of the *n* output cores, the *n* output windings being connected in series with a unidirectional device to the output circuit the said device being so directed as to block output pulses generated by the triggering of the said output cores.

7. A modulator according to claim 5, in which the setting core, and the coding or peak limit core which has been triggered, are restored by the sampling wave after the output cores have been triggered, and in which the said sampling wave is supplied to bias windings on all the said output cores in such manner as to prevent the restoration of the output cores in response to the pulse produced by the restoration of the coding or peak liimt core.

8. An arrangement for storing a bit of information comprising: a core of ferromagnetic material having a hysteresis curve with sharp discontinuities and being capable of existing in two conditions with the magentic flux substantially saturated in respectively opposite directions; an input winding on the said core; means for producing, in response to the said bit of information, a setting pulse of predetermined voltage and duration which is just sufficient to trigger said core; means for applying the setting pulse to the said input winding in such manner as to trigger the said core by reversing the condition of saturation thereof; a plurality of additional cores of the same kind of ferromagnetic material as the first-mentioned core, each additional core having an input winding connected in series with the input winding of the first-mentioned core, in such manner that the said setting pulse is applied to all the input windings in series; a control signal winding on the first-mentioned core and on each of the additional cores; means for magnetically biasing all the said cores by respectively different amounts; means for supplying a variable control signal current to all the control signal windings in such manner as to produce a control magnetic field in each core in opposition to the bias magnetic field therein, whereby not more than one of the said cores can be triggered by the said pulse; a limit core of the same ferromagnetic material as the first-mentioned core and having an input winding connected in series with all the other input windings; and means for magnetically biasing the limit core in such manner that the limit core is triggered by the said pulse only if the control signal current is of such magnitude that none of the other cores can be triggered by the said pulse.

9. An electric pulse code modulator comprising: an arrangement according to claim 8, in which the setting pulse is derived from a source of a periodic sampling wave, and in which the variable control current is derived from a source of a signal wave to be coded; and means controlled by the core which has been triggered by the setting pulse for producing a particular code combination of digit pulses which corresponds to the last-mentioned core.

References Cited in the file of this patent

UNITED STATES PATENTS

| | | |
|---|---|---|
| 2,750,580 | Rabenda | June 12, 1956 |
| 2,768,367 | Rajchman | Oct. 23, 1956 |
| 2,782,399 | Rajchman | Feb. 19, 1957 |
| 2,834,004 | Canepa | May 6, 1958 |
| 2,894,151 | Russell | July 7, 1959 |
| 2,902,608 | Shelman | Sept. 1, 1959 |
| 2,909,673 | Gunderson | Oct. 20, 1959 |
| 2,910,594 | Bauer | Oct. 27, 1959 |
| 2,962,704 | Buser | Nov. 27, 1960 |
| 2,981,847 | Ruhman | Apr. 25, 1961 |